United States Patent [19]

Cohen

[11] 4,080,173

[45] Mar. 21, 1978

[54] INTERNALLY COATED REACTION VESSEL FOR USE IN OLEFINIC POLYMERIZATION

[75] Inventor: Louis Cohen, Avon Lake, Ohio

[73] Assignee: The B. F. Goodrich Company, Akron, Ohio

[21] Appl. No.: 807,959

[22] Filed: Jun. 20, 1977

[51] Int. Cl.² ............................................. B01J 1/20
[52] U.S. Cl. .................................. 23/285; 23/288 E; 427/230; 427/236; 427/239; 428/35; 526/62
[58] Field of Search ................. 428/35; 526/6.7, 62; 23/252 A, 285, 288 E; 427/230, 236, 239

[56] References Cited

U.S. PATENT DOCUMENTS

| 3,825,434 | 7/1974 | Berens et al. ......................... 23/285 |
| 3,849,179 | 11/1974 | Morningstar ......................... 23/285 |
| 4,007,320 | 2/1977 | Peterson ............................... 23/285 |
| 4,024,301 | 5/1977 | Witenhafer et al. .................. 23/285 |
| 4,024,330 | 5/1977 | Morningstar et al. ............... 427/230 |

Primary Examiner—William R. Dixon, Jr.

Attorney, Agent, or Firm—Roy P. Wymbs

[57] ABSTRACT

This invention relates to a polymerization reaction vessel having a coating on the inner surfaces thereof resulting from applying thereto a coating composition containing, as a primary ingredient, (1) the self-condensation product of a polyhydric phenol, or (2) the condensation product of two or more polyhydric phenols, or (3) the self-condensation product of a polyhydric naphthol, dissolved in an aqueous alkali metal hydroxide solution. When polymerizing olefinic monomers, such as vinyl halides, vinylidene halides, and vinylidene monomers having at least one terminal $CH_2=C<$ group, and mixtures thereof, in the presence of said coating, polymer build-up on the inner surfaces of the reaction vessel is substantially eliminated. Further, multiple charges or batches of polymer can be made in said internally coated reaction vessel without opening the same between charges thus preventing the escape of unreacted monomer to the surrounding atmosphere.

23 Claims, No Drawings

INTERNALLY COATED REACTION VESSEL FOR USE IN OLEFINIC POLYMERIZATION

CROSS REFERENCE TO RELATED APPLICATIONS

Related applications for U.S. Pat. are Ser. No. 574,037, filed May 2, 1975, now U.S. Pat. No. 4,024,301, in the names of Donald E. Witenhafer, James B. Haehn and Louis Cohen, and Ser. No. 714,317, filed Aug. 16, 1976, in the name of Louis Cohen now abandoned.

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "buildup", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are usually unstable and during the polymerization reaction, vinyl chloride polymer builds up on the interior surfaces of the polymerization reactor, including the surfaces of the baffles and agitator. Obviously, this polymer build-up must be removed since it results in further formation of polymer build-up which in turn results in a crust that adversely affects heat transfer and contaminates the polymer being produced.

The nature of the polymer build-up, or insoluble deposit on the walls of the reactor, is such that in the commercial production of polymers, as described above, it has in the past been standard practice, after each polymerization reaction is completed, to open the reactor and scrape the polymer build-up off the walls and off the baffles and agitator. An operation such as this is not only costly, both in labor and down-time of the reactor, but presents potential health hazards as well. While various methods have heretofore been proposed to reduce the amount and nature of polymer build-up on polymerization reactor surfaces, such as solvent cleaning, various hydraulic and mechanical reactor cleaners, and the like, none has proved to be the ultimate in polymer build-up removal. That is to say, these various methods and apparatus have done an acceptable job, but thre is still room for improvement in this area, particularly from an economic point of view.

In the related application for U.S. patent, Ser. No. 574,037, referred to above, there is disclosed and claimed a process for coating a reactor using an alkali metal hydroxide solution of a polyaromatic amine. Coating with a polyaromatic amine gives excellent results. However, it was felt that if self-condensation of polyhydric phenols or naphthols could be achieved, a likewise excellent coating would result.

SUMMARY OF THE INVENTION

It has been found that if a polymerization reaction vessel, particularly one having inner surfaces of stainless steel, has been previously coated on said inner surfaces with the proper coating, undesirable build-up on said surfaces can be substantially decreased, and in many cases entirely eliminated, when polymerizing olefinic monomers therein. I have now found that when the interior surfaces of a polymerization reactor are coated with an aqueous alkili metal hydroxide solution containing a condensed polyhydric phenol or naphthol, polymer buildup on said interior surfaces of the reactor is substantially eliminated. Due to the nature of the coating solution or composition, it can be applied to the inner surfaces of the reactor without opening the same thus providing a closed polymerization system. By use of the instant coating composition, the necessary surface tension ($\gamma_c$) for wetting of a solid surface is obtained. In polymerizing the monomers in such a coated reaction vessel or reactor, the same is done in an aqueous polymerization medium which is kept in constant contact with said coated surfaces throughout the polymerization reaction.

DETAILED DESCRIPTION

In accordance with the present invention, a film or coating of a condensed polyhydric phenol or naphthol is applied to the interior surfaces of a polymerization reactor or vessel by merely contacting said surfaces with an aqueous alkali metal hydroxide solution of said condensed polyhydric phenol or naphthol. Likewise, all exposed surfaces in the interior of the reactor, such as the baffles, agitator or mixing mechanism, the condenser when one is employed, and the like, are also treated in like manner. After the aqueous alkali metal hydroxide coating solution has been applied to the surfaces, the polymerization medium can be introduced to the reactor and the reaction started without the necessity of drying said surfaces prior to the introduction of the polymerization medium. However, it is preferred, and the best results are obtained, when after the application of the coating solution to the interior surfaces of the reactor, the surfaces are rinsed with water, such as by spraying or by filling the reactor with water and draining, thereby, surprisingly, leaving on said surfaces a tightly adhering coating or film of the condensation product which is not affected by the polymerization medium even through vigorously agitated during the polymerization reaction.

The self-condensed and co-condensed polyhydric phenols useful in the practice of the present invention are made by heating any one or more of resorcinol, hydroquinone, catechol or phloroglucinol either with or without a suitable catalyst. The same is true for the self-condensed polyhydric naphthols, such as, for example, 2, 7 - dihydroxy naphthalene, 3,7 -diphydroxy naphthalene, 2, 6 - dihydroxy naphthalene, and the like. The polyhydrix phenol or naphthol is heated under an inert atmosphere, such as nitrogen, argon, and the like, at a temperature in the range of about 210° C. for a period of time ranging from about 10 minutes to about 500 minutes or 8 hours. Various catalysts may be employed in the reaction, such as zinc chloride, aluminum chloride, sodium hydroxide, and the like. I have found that sodium hydroxide is the best catalyst. A catalyst concentration of from about 0.05 moles to about 0.50 moles per mole of the compound or compounds being condensed is satisfactory. However, the amount of catalyst employed is not critical. It is understood, of course, that the particular time and temperature selected is dependent upon the catalyst employed and the final molecular weight of the condensation product desired.

When a polyhydric pheno is self-condensed, there is analytical evidence that the product is predominantly a poly (hydroxyphenylene). However, some polyether is also formed, namely, poly(oxphenylene). For example, when resorcinol is self-condensed, the reaction is believed to be as follows:

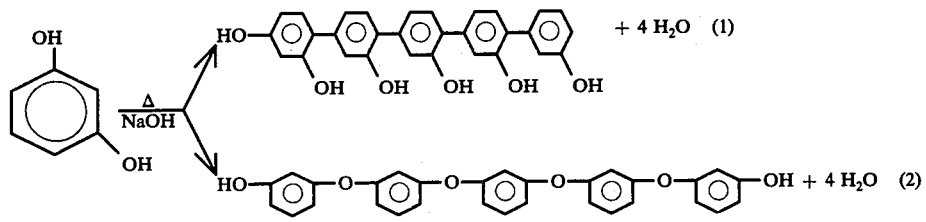

Equation (1) is the poly(hydroxyphenylene) and equation (2) is the poly(oxyphenylene) or polyether. (1) has a calculated hydroxyl content of 21.3% and (2) has a calculated 7.1% hydroxyl content. This theory is supported by work done by Paushkin, et al and reported in Vycokomol. Svedin., Ser. B, II (5) (1969), pp. 376-378. They report, in the self-condensation of resorcinol, a calculated hydroxyl content of 21.4% and found 19.0% hydroxyl content thus indicating that the major portion of the product is poly(hydroxyphenylene). The equations (1) and (2) are illustrative in the case where the self-condensed resorcinol has a molecular weight of about 500 but a variety of molecular weights result as oligomers, depending upon the reaction conditions.

As has been previously pointed out, an alkali metal hydroxide solution of a condensed polyhydric phenol or naphthol when applied to the interior surfaces of a polymerization reactor, will reduce the buildup of polymer thereon. However, the condensation products are colored, being glassy red-amber products, and solutions thereof will discolor the polymer particles that do form on the inner surfaces of the reactor. If these polymer particles are inadvertently removed from said surfaces, during the course of making the polymerization product, such as polyvinyl chloride (PVC), the entire batch of polymer can be rejected for inferior quality due to the occurrence of said off-white particles of polymer. This discoloration problem occurs only when the concentration of the condensation product in the alkali metal hydroxide is too high. I have found that a concentration of condensation product in the range of about 0.10% to about 3% by weight is satisfactory in accomplishing the objectives of the present invention and such coating solutions are only slightly amber-colored. A preferred concentration range is from 0.2% to 1% by weight of the condensation product in the alkali metal hydroxide.

In order to prevent polymer buildup in a reactor, you need a water-wettable surface. An ordinary solid surface, such as stainless steel for example, is not water-wettable due to the normal contamination of said surface with organic materials through contact with the atmosphere. The surface can be cleaned, such as with chromic acid or an abrasive cleanser, for example, and it will become water-wettable. However, this is not the full answer, since the surface will not remain in that condition for a sufficient length of time, that is, for more than the duration of a single polymerization reaction. That is to say, the surface must be recleaned after each polymerization cycle. Therefore, applying a coating to the surface which will be water-wettable and resist polymer buildup thereon and remain on said surface throughout multiple reaction cycles is more desirable.

When a metal or solid surface is non-wettable, a liquid, such as water, thereon will form droplets and not flow out into a smooth uniform film. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma_c$". The $\gamma_c$ is measured in dynes per centimeter. Using water as the standard, in order for a solid surface to be wettable, $\theta$ must equal 0 or be very close to it, and $\gamma_c$ must be 72/dynes/cm. or greater.

More importantly, the material being applied to the surface should not only form a wettable surface, but also form a layer or film thereon which is not readily removable. This film adheres to the solid or metal surface by adsorption and in many cases, the film is a monolayer of material applied which is of the order of a molecule in thickness. These films of such thickness are invisible to the naked eye thus further solving the color problem heretofore referred to. Of course, films of greater thickness can result when using higher solids content coating solutions which films or coatings are visible to the naked eye. The film or layer formed by the coating composition applied to the surface is not removable by washing with water. That is to say, the coating or film is resistant to removal from the surfaces when a turbulent aqueous reaction medium is in contact therewith, caused by the agitation of the polymerization mixture in the reactor.

The coating solutions of the instant invention are made by conventional methods, using heat and agitation where necessary. Usually a temperature in the range of about 0°C. to about 100° C. is satisfactory. Agitation during dissolution is desirable. When the concentration of the condensation product is within the ranges given above, the aqueous alkali metal hydroxide coating solution thereof may be easily sprayed on the inner surfaces of the reactor through spray nozzles mounted thereon. Further, the molecular weight of the condensation product has an effect on the concentration of the condensation product in the coating solution or the total solids content of said solution. The total solids content of the condensation product in the coating solutions of the present invention will be in the range of about .10% to about 3.0% by weight. The preferred condensation products are those having a molecular weight in the range of about 300 to 1000. However, since the molecular weight of the condensation product affects the total solids content in the coating solution, the total solids content could, in certain instances, be greater than 3% or less than 0.10% by weight.

The aqueous alkali metal hydroxide solutions used in making the coating solutions of the instant invention are those made from a metal in Group 1A of the periodic system. For example, such hydroxides as sodium hydroxide, lithium hydroxide, potassium hydroxide, rubidium hydroxide, cesium hydroxide, and francium hydroxide. Aqueous solutions of other compounds may also be used. For example, aqueous solutions of quaternary amines, such as the tetraalkyl ammonium hydroxides, and the like, or other alkali metal salts, such as phosphates, for example, trisodium phosphate, and the like. In order to obtain the desired results, the concentration of the alkali metal hydroxide in the aqueous coating solution should be between about 0.04% by weight and about 0.60% by weight. Preferably the concentration of alkali metal hydroxide is from 0.10% to 0.25% by weight.

As previously pointed out, the coating solution is usually applied to the inner reactor surfaces by spraying. However, it is also possible to apply the coating solution by flooding the reactor and then draining, or painting or brushing on, but spraying is the most practical and economical method of application. After spraying the coating solution on the inner surfaces and draining the reactor, the polymerization reaction can be started immediately without further treatment of said surfaces. However, it has been found that excellent results are obtained when after applying the coating solution to the inner surfaces the reactor, the coated surfaces are sprayed with water and the reactor drained prior to charging the reactor with the polymerization mixture or recipe. It should also be pointed out that the present coating works equally well on glass or metal surfaces, such as stainless steel, and the like.

While the exact adhesion mechanism of the coating to the surfaces of the reactor is not known for certain, it is believed to involve some type of electrical force or adsorption between the reactor surfaces and the condensed polyhydric phenol or naphthol. At any rate, the coating composition of the present invention does substantially eliminate polymer buildup on the reactor surfaces and what little polymer buildup, if any, that may occur, is of the sandy type which is of such a nature that it is readily removable from the reactor surfaces without the necessity of manual scraping procedures. The polymer buildup to be avoided is what is referred as "paper buildup" since this type of buildup is very difficult to remove and usually requires hand scraping or the use of a high pressure jet stream of water or other liquid. In either event, the reactor must be opened in order to clean the same, which, of course, allows the escape of unreacted monomer, such as vinyl chloride, into the atmosphere which is hazardous.

In accordance with the present invention, multiple polymerizations may be run without opening the reactor between charges. Although multiple charges may be run without recoating the surfaces, it has been found to be expeditious, and preferred, to recoat the internal surfaces of the reactor after each charge to insure uniform and efficient production. As previously pointed out, with the spray nozzles permanently mounted at strategic points on the reactor, it is possible to reach all inner surfaces thereof. When it is decided to recoat the reactor, the reactor is drained, and the inner surfaces of the reactor are flushed with water. The coating solution is sprayed on the surfaces by means of the spray nozzles and the reactor is drained of the excess solution in such a way that the same can be sent to a recovery system, if desired. Then, optionally, the surfaces are sprayed with water and effluent is discarded, or recovered, if desired. Thereafter, the reactor is charged with the polymerization medium and ingredients in the usual manner and the polymerization reaction commenced. It is understood, of course, that one can recoat the reactor as often as desired without opening the same, even after every charge is polymerized.

After the application of the coating composition on the interior surfaces of the reaction vessel, and when elected, spraying thereof with water, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the apparatus and process may likewise be applied in the dispersion, emulsion, or suspension polymerization of any polymerizable ehtylenically unsaturated monomer or monomers where undersirable polymer buildup occurs. Examples of such monomers are other vinyl halides and vinylidene halides, such as vinyl bromide, vinylidene chloride, etc., vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene drivatives including α-methyl styrene, vinyl toluene, chlorostyrene; vinyl naphthalene; diolefins including butadiene, isoprene, chloroprene, and the like; and mixtures of any types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $CH_2=C<$ grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

The condensation products of polyhydric phenols or naphthols used in the present invention will oxidize on normal exposure to oxygen. This oxidation is not detrimental if the condensation product is used within a short time after being made. However, oxidation of the condensation product causes darkening in color of the same with its attendant difficulties, as previously pointed out. Further, the adherence of the condensation product to the reactor surfaces is adversely affected by such oxidation. In order to lessen the chance of color problems, even though very low concentrations of the condensation products are used in the coating solutions of the instant invention, it is often desirable to incorporate antioxidants in the coating solution. Such addition does not adversely affect the properties or performance of the coating solutions. It has been found that when sodium ascorbate or ascorbic acid is incorporated in the coating solution, in amounts in the range of about 0.02% to about 0.10% by weight, such addition significantly retards darkening of the solution and also retards increase in adsorption time. Any other antioxidant may be employed, such as sodium dithionite, sodium "phenolic acid", and the like.

In order to rate the various coatings, as particularly set forth in the specific examples which follow hereinafter, there has been devised a rating scale with respect to paper and sandy buildup. An uncoated reactor, referred to as the control, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this Example, self-condensed resorcinol was employed in the coating solution. Two self-condensed resorcinols were made, one without using a catalyst and the other using 25 molar % NaOH as a catalyst. In each case the resorcinol was heated or cooked in a reaction vessel under a nitrogen atmosphere. In the case of no catalyst, the heating was continued for 8 hours at 300° C. The resultant product was made up into a coating solution containing 3% of self-condensed resorcinol in a 1% NaOH solution. The pH of the coating solution was 12. In the case using the catalyst, heating was conducted under nitrogen for 22 minutes at 245° C. and for 27 minutes at 305° C. A coating solution was prepared containing 0.2% self-condensed resorcinol in a 1% NaOH solution and the resulting pH was 12. Reactors were Ajax cleaned and coated with each of the solutions and the coating rinsed with water. Each of the coatings had a $\gamma_c$ greater than 72 dynes/cm. Thereafter, the following recipe was charged to each reactor:

| | |
|---|---|
| Vinyl Chloride | 1000 grams |
| Water (demineralized) | 2055 grams |
| Vinol 540[1] | 0.5 gram |
| SBP[2] (Catalyst) | 0.5 CC. |

[1]88% hydrolyzed polyvinyl acetate
[2]di-secondary butyl peroxydicarbonate

A full reactor was used in the polymerizations, sufficient water being added to keep the reactor full. The temperature was maintained at 57° C. and the reaction medium was agitated. The water was added during the reaction as the mixture shrank because of formation of polymer. Upon the addition of 400 grams of water, the reaction was discontinued. The contents of each reactor were then removed in usual fashion. After removal of the polymer charge from the reactor, the internal surfaces were rinsed with water, then recoated and rinsed with water and a second charge made and polymerized. After the second charge was polymerized, a third charge was polymerized using the same procedure as outlined above. Upon completion of the third charge, the internal surfaces of the reactor were classified in accordance with the aforementioned procedure for rating said surfaces. The results were as follows:

| | Build-Up Rating | |
|---|---|---|
| | Paper | Sandy |
| 1. Control (no coating) | 1.5 | 1.5 |
| 2. No Catalyst Product | 0.1 | 0.0 |
| 3. Catalyst Product | 0.2 | 0.3 |

The results show the superior results of the coated reactor over the uncoated reactor.

EXAMPLE II

In this Example, self-condensed hydroquinone was employed in the coating solution. The reaction was conducted in a reaction vessel under a nitrogen atmosphere by heating hydroquinone plus 12.5 molar % NaOH for 15 minutes at 220° C. The product was dissolved in aqueous NaOH to give a 0.2% self-condensed hydroquinone solution with a pH of 9. For purposes of identification this product was designated as "Coating A". A second self-condensed hydroquinone was made by heating hydroquinone with 25 molar % NaOH and 10 molar % ascorbic acid for 5 minutes at 280° C. This product was also dissolved in aqueous NaOH to give a 0.2% solution with a pH of 9. This product was identified as "Coating B". Using the procedure outlined in Example I, the internal surfaces of reactors were coated with Coatings A and B. Each coating had a $\gamma_c$ greater than 72 dynes/cm. Then following the procedure of Example I, and the same recipe of Example I, three charges were run in the coated reactors and thereafter classifying the reactors with the following results:

|  | Build-Up Rating | |
|---|---|---|
|  | Paper | Sandy |
| 1. Control (no coating) | 1.5 | 1.5 |
| 2. Coating A | 0.2 | 0.3 |
| 3. Coating B | 0.3 | 0.2 |

Here again one can see the superior results of the coated reactor over the uncoated reactor.

EXAMPLE III

In this Example, self-condensed catechol was prepared by heating catechol plus 25 molar % NaOH for 5 minutes at 270° C. under a nitrogen atmosphere. The product was dissolved in aqueous NaOH to give 0.2% self-condensed catechol solution with a pH of 9.2. A reaction vessel was coated with this solution in the same manner as in Example I. The coating has a $\gamma_c$ greater than 72 dynes/cm. in 5 seconds. Thereafter, 3 polymerization charges were run as in Example I with the following results: Paper build-up 0.3 and sandy build-up 0.3.

EXAMPLE IV

In this Example, a co-condensed polyhydric phenol was used which was made by co-condensing hydroquinone and resorcinol. 50 molar percent of hydroquinone (1.1 grams) was reacted with 50 molar percent of resorcinol (1.1 grams) by heating for 5 minutes at 300° C. in the presence of 0.4 gram of 50% NaOH (12.5 molar percent) as catalyst. The product was dissolved in 0.2% NaOH to give a 0.5% solution with a pH of 12. A reaction vessel was coated with this solution in the same manner as in Example I. The coating had a $\gamma_c$ greater than 72 dynes/cm. in 5 seconds. Thereafter, 3 polymerization charges were run as in Example I with the following results:

| Build-Up | Control (No Coating) | First Charge | Second Charge | Third Charge |
|---|---|---|---|---|
| Paper | 1.5 | 0.2 | 0.0 | 0.0 |
| Sandy | 1.5 | 0.0 | 0.3 | 0.4 |

The superior results of the coated reactor over the uncoated reactor are evident from the above data.

Coating of the internal surface of the polymerization reactor, in accordance with the present invention, substantially reduces, and in many cases, practically eliminates polymer buildup on said surfaces during the polymerization reaction and thus results in increased production over a unit period of time. In those instances where a little polymer buildup does accumulate on the interior surfaces, it is not of the hard, rough difficult-to-remove type and is easily removed without employing the difficult and tedious scraping methods that are presently necessary in the art. More importantly, the present invention enables one to operate a closed polymerization system, which, in the case of vinyl chloride polymerization, has the advantage of reducing drastically the parts per million of vinyl chloride in the atmosphere of the plant. Such reduction in vinyl chloride in the atmosphere meets the requirements recently promulgated by OSHA (Occupational Safety and Health Administration) and EPA (Environmental Protection Agency). Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for substantially eliminating the buildup of polymers on the internal surfaces of a polymerization reaction vessel which comprises applying to said surfaces a coating solution comprised of an alkali metal hydroxide solution containing a condensation product selected from the group consisting of (1) the self-condensation product of a polyhydric phenol, (2) the condensation product of two or more polyhydric phenols, and (3) the self-condensation product of a polyhydric naphthol, and wherein said polyhydric phenol(s) is selected from the group consisting of resorcinol, hydroquinone, catechol and phloroglucinol.

2. A process as defined in claim 1 wherein after application of said coating solution to said surfaces the coating on said surfaces is rinsed with water prior to the start of polymerization in said vessel.

3. A process as defined in claim 1 wherein the coating solution contains from about 0.10% to about 3.0% by weight of said condensation product.

4. A process as defined in claim 1 wherein the alkali metal hydroxide is sodium hydroxide.

5. A process as defined in claim 1 wherein the alkali metal hydroxide is potassium hydroxide.

6. A process as defined in claim 1 wherein the alkali metal hydroxide is lithium hydroxide.

7. A process as defined in claim 1 wherein the polyhydric phenol is resorcinol.

8. A process as defined in claim 1 wherein the polyhydric phenol is hydroquinone.

9. A process as defined in claim 1 wherein the polyhydric phenol is catechol.

10. A process as defined in claim 1 wherein the coating solution contains from about 0.02% to about 0.10% by weight of an antioxidant.

11. A process as defined in claim 2 wherein the polyhydric phenol is resorcinol and the alkali metal hydroxide is sodium hydroxide.

12. A process as defined in claim 3 wherein the polyhydric phenol is resorcinol and the alkali metal hydroxide is sodium hydroxide.

13. A process as defined in claim 12 wherein the coating solution contains from about 0.10% to about 3.0% by weight of said condensation product.

14. A process as defined in claim 1 wherein the condensation product is the self-condensation product of a polyhydric phenol.

15. A process as defined in claim 1 wherein the condensation product is the condensation product of two or more polyhydric phenols.

16. A process as defined in claim 15 wherein the condensation product is the co-condensation product of resorcinol and hydroquinone.

17. A polymerization reaction vessel having on all the internal surfaces thereof a coating comprised of a condensation product selected from the group consisting of (1) the self-condensation product of a polyhydric phenol, (2) the condensation product of two or more polyhydric phenols, and (3) the self-condensation product of a polyhydric naphthol, and wherein said polyhydric phenol(s) is selected from the group consisting of resorcinol, hydroquinone, catechol and phloroglucinol.

18. A polymerization reaction vessel as defined in claim 17 wherein the condensation product is self-condensed resorcinol.

19. A polymerization reaction vessel as defined in claim 17 wherein the condensation product is self-condensed hydroquinone.

20. A polymerization reaction vessel as defined in claim 17 wherein the condensation product is self-condensed catechol.

21. A polymerization reaction vessel as defined in claim 17 wherein the coated surfaces are characterized by having a critical surface tension of at least 72 dynes/centimeter and a contact angle with water of about zero.

22. A polymerization reaction vessel as defined in claim 21 wherein the condensation product is self-condensed resorcinol.

23. A polymerization reaction vessel as defined in claim 17 wherein the condensation product is the co-condensation product of resorcinol and hydroquinone.

* * * * *